United States Patent
Quartararo et al.

(10) Patent No.: US 7,005,059 B1
(45) Date of Patent: Feb. 28, 2006

(54) CATALYST HAVING AT LEAST ONE ELEMENT OF GROUP VIIB AND ITS USE IN HYDRO-TREATING

(75) Inventors: Juliette Quartararo, Marseille (FR); Samuel Mignard, Chatou (FR); Slavie Kasztelan, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/297,737

(22) PCT Filed: Nov. 7, 1997

(86) PCT No.: PCT/FR97/02005

§ 371 (c)(1),
(2), (4) Date: May 4, 2001

(87) PCT Pub. No.: WO98/19791

PCT Pub. Date: May 14, 1998

(30) Foreign Application Priority Data

Nov. 7, 1996 (FR) .................................. 96 13573

(51) Int. Cl.
*C10G 45/04* (2006.01)
*B01J 23/00* (2006.01)

(52) U.S. Cl. ................ 208/213; 208/59; 208/215; 208/217; 208/254 H; 208/111.05; 208/111.35; 502/325; 502/335; 502/241; 502/232; 502/216; 502/221; 502/224; 502/229

(58) Field of Classification Search ........... 208/59, 208/213, 215, 217, 254 H, 111.05, 111.35; 502/325, 335, 241, 232, 216, 221, 224, 229
See application file for complete search history.

(56) References Cited

U.S. PATENT DOCUMENTS

| | | | | |
|---|---|---|---|---|
| 3,617,485 A | * | 11/1971 | Kittrell | 208/59 |
| 3,758,512 A | * | 9/1973 | Kanetaka et al. | 549/325 |
| 3,915,848 A | * | 10/1975 | Kravitz et al. | 208/216 R |
| 4,018,667 A | | 4/1977 | Holm | 208/134 |
| 4,385,984 A | * | 5/1983 | Biwaard et al. | 208/19 |
| 4,430,198 A | * | 2/1984 | Heck et al. | 208/112 |
| 4,463,104 A | * | 7/1984 | Antos et al. | 502/213 |
| 4,693,991 A | * | 9/1987 | Bjornson et al. | 502/220 |
| 4,724,226 A | * | 2/1988 | Cheng et al. | 502/204 |
| 4,898,661 A | * | 2/1990 | Ushio et al. | 208/117 |
| 5,403,806 A | * | 4/1995 | Simpson | 502/211 |
| 5,507,940 A | * | 4/1996 | Ryan | 208/254 H |
| 5,525,211 A | * | 6/1996 | Sudhakar et al. | 208/217 |
| 5,677,259 A | * | 10/1997 | Yamase et al. | 502/313 |
| 5,922,639 A | * | 7/1999 | Alario et al. | 502/230 |
| 5,968,345 A | * | 10/1999 | Alario et al. | 208/139 |
| 6,106,698 A | * | 8/2000 | Benazzi et al. | 208/111.13 |
| 6,149,799 A | * | 11/2000 | Rayband et al. | 208/49 |
| 6,200,927 B1 | * | 3/2001 | Shukis et al. | 502/355 |
| 6,218,334 B1 | * | 4/2001 | Alario et al. | 502/226 |
| 6,235,670 B1 | * | 5/2001 | Benazzi et al. | 502/63 |

FOREIGN PATENT DOCUMENTS

| | | | |
|---|---|---|---|
| EP | 0 036 703 | | 9/1981 |
| EP | 0 547 895 A1 | | 12/1993 |
| EP | 0 573 973 A1 | | 12/1993 |
| GB | 1460480 A | * | 1/1977 |
| GB | 2 066 690 | | 7/1981 |

* cited by examiner

*Primary Examiner*—Walter D. Griffin
(74) *Attorney, Agent, or Firm*—Millen, White, Zelano & Branigan, P.C.

(57) ABSTRACT

The invention relates to a catalyst for the transformation of hydrocarbon-containing feedstocks, in particular hydrotreatment, comprising at least one metal of group VIIB and at least one hydro-dehydrogenating metal (of the non-noble metals of group VIII and/or the metals of group VIB, preferably molybdenum or tungsten) and at least one porous matrix, generally of the amorphous oxide or poorly crystallized type. The catalyst also contains silicon, boron, or phosphorus. It can also optionally contain at least one halogen.

21 Claims, No Drawings

CATALYST HAVING AT LEAST ONE ELEMENT OF GROUP VIIB AND ITS USE IN HYDRO-TREATING

This invention relates to a catalyst and a process for the transformation of hydrocarbon-containing feedstocks and in particular hydrotreatment. The catalyst comprises at least one metal of group VIIB [group 7 according to the new notation of the periodic table (Handbook of Chemistry and Physics, 76th Edition, 1995–1996), i.e., rhenium, manganese and technetium, preferably rhenium and manganese, even more preferably rhenium, and at least one hydro-dehydrogenating metal and at least one porous matrix, generally of amorphous oxide or poorly crystallized type. The hydro-dehydrogenating element is selected from among the non-noble metals of group VIII and the metals of group VIB, preferably molybdenum and tungsten. The catalyst also contains phosphorus, boron or silicon and optionally at least one element of group VIIA (group 17), preferably fluorine.

This invention also relates to the use of the catalyst for the transformation of hydrocarbon-containing feedstocks such as the petroleum fractions, the fractions that are obtained from carbon, etc. . . . and more particularly the hydrotreatment that primarily includes the reactions of hydrodenitrating, and/or hydrodesulfurization, and/or hydrodemetallization, and/or hydrodeoxygenation, and/or hydrogenation-hydrodearomatization.

Hydrotreatment takes on increasing importance in the practice of refining with the growing necessity to reduce the amount of sulfur, nitrogen and aromatic compounds in the petroleum fractions. This results, on the one hand, primarily in the importing of crude oils that are increasingly rich in heavy fractions, low in hydrogen and rich in heteroatoms, including nitrogen and sulfur, and, on the other hand, in specifications on the contents of sulfur and aromatic compounds that are imposed in various countries for the commercial fuels.

The current processes of catalytic hydrotreatment use catalysts that can promote the main reactions that are useful for exploiting heavy fractions, in particular the hydrogenation of aromatic cores (HAR), hydrodesulfurization (HDS), hydrodenitrating (HDN) and other hydroeliminations. The hydrotreatment is used for treating feedstocks such as gasolines, gas oils, vacuum gas oils, atmospheric or vacuum residues that may or may not be deasphalted. For example, cracking processes and catalytic hydrocracking processes are indicated for the pretreatment of the feedstocks. The influence of this hydrotreatment prior to the overall output and the service life of the cracking and/or hydrocracking catalyst is all the more important since more active hydrotreatment catalysts are used in hydrodenitrating and in hydrodesulfurization. At least one hydrotreatment stage is usually integrated into each of the schemes that are known for upgrading heavy petroleum fractions.

These catalysts that are used in hydrotreatment combine a matrix with a large surface area (generally 100 to 800 $m^2 \cdot g^{-1}$) having a weak to strong surface acidity and a hydrogenating function that is provided by at least one metal of group VIB of the periodic table such as chromium, molybdenum or tungsten and/or at least one non-noble metal of group VIII such as iron, cobalt or nickel.

A catalyst that contains molybdenum or tungsten, cobalt or nickel combined with rhenium or iridium has already been used for the hydrodesulfurization of gas oils, as described in Patent EP-A-0,573,973. An effort has been made to improve the catalyst and the hydrotreatment process.

The invention therefore relates to a catalyst that comprises at least one matrix, at least one metal of group VIIB of the periodic table, and an element that is selected from the group that is formed by phosphorus, boron or silicon, and at least one metal or a combination of metals that ensure a hydro-dehydrogenating function that is selected from the group that is formed by the non-noble metals of group VIII, molybdenum and tungsten.

The non-noble metals of group VIII are iron, cobalt and nickel, and preferably cobalt and nickel are used. The metals of group VIB that are used are advantageously molybdenum and tungsten. Preferably, at least one metal of group VIII is combined with Mo or W. An additional element selected from the group that is formed by P, B and Si (i.e., phosphorus or boron or silicon). Optionally at least one halogen (element of group VIIA) is present, preferably fluorine.

Phosphorus, boron or silicon is preferably deposited on the substrate, for example by impregnation, and is then not introduced in matrix form.

The catalyst according to the invention is generally in substrate form, i.e., it comprises a matrix that performs in particular the substrate role; it could be in bulk form, i.e., it does not comprise a matrix.

The catalyst, in particular for hydrotreatment, generally contains in % by weight relative to the total mass of the catalyst:

0.01 to 99.7% and preferably 0.01 to 95% and even more preferably 0.01 to 85% of a generally amorphous matrix, 0.01 to 50%, preferably 0.05 to 40%, and even more preferably 0.1 to 30% and generally 0.1 to 20% of at least one metal of group VIIB, such as manganese, technetium or rhenium, preferably rhenium or manganese, even more preferably rhenium, 0.01 to 50% of non-noble hydro-dehydrogenating metal (metals) of group VIII and/or hydro-dehydrogenating metal (metals) of group VIB, and more specifically if a non-noble metal (metals) of group VIII is present, its content is 0.01 to 20%, preferably 0.05 to 15%, and even more preferably 0.1 to 12%, and if a metal (metals) of group VIB is present, its content is 0.01 to 30%, preferably 0 or 0.01 to 25% and even more preferably 0.01 to 20%, 0.01 to 20%, preferably 0.01 to 15% of an element that is selected from the group that is formed by the elements Si, P and B, (Si or P or B) and preferably phosphorus or boron, 0 to 15%, preferably 0 to 10% of at least one halogen, i.e., an element that is selected from the group VIIA, preferably fluorine.

The substrate catalysts of this invention can be prepared by any method that is well known to one skilled in the art.

The preferred process for preparation of the catalyst of this invention generally comprises at least the following stages:

a) A solution is formed that contains at least the following compounds: a solvent, at least one source of an element of group VIB, at least one source of an element of group VIII, and/or at least one source of an element of group VIB, at least one source of an element that is selected from the group that is formed by the elements: P, B and Si, optionally a source of an element that is selected from among the halogens, b) the substrate (the matrix) is wetted or impregnated by said solution, and said mixture is kept at a temperature of between ambient temperature and 80° C. for several hours, c) the moist solid that is obtained in stage b) is dried at a temperature of between 80 and 150° C., generally in a furnace, and d) the dry solid that is obtained in stage c) is calcined at a temperature that is higher than 150° C., generally under air.

The mixture that is produced in stage a) above can be produced simultaneously or successively, whereby the order is not important, in the same physical space or separately.

It is possible to perform each of preceding stages a) to d) several times, separately or combined with at least one other of preceding stages a) to d), as is known to one skilled in the art. For example, it is possible to perform the succession of stages b), c) and d) at least twice.

Thus, for example, in the preferred case where the metal of group. VIIB is rhenium and where the metal of group VIII is nickel, it is possible to impregnate the matrix, for example of alumina, by ammonium perhhenate, to perform a drying at 120° C., then to impregnate by nickel nitrate, to perform a drying at 120° C., and to perform a calcination for example and preferably by dry air in a flushed-bed reactor at atmospheric pressure, for example at 500° C. for 2 hours.

It is also possible to perform the synthesis of the catalyst from solids that comprise the element of group VIIB and/or the element of group VIII, whereby said solids are obtained respectively from salts of the element of group VIIB and salts of the element of group VIII, whereby said syntheses are produced simultaneously or successively, whereby the order is not important, in the same physical space or separately; then to perform the mechanical mixing of said solids with the matrix, and finally, after an optional shaping, to perform the calcination of said mechanical mixture to obtain the catalyst according to the invention.

It is also possible to produce the mixture of powders comprising the source of the element of group VIIB, the source of the element of group VIII, optionally water, the source of the element that is selected from among P, B and Si, and optionally the source of the element of group VIIA and to impregnate the matrix.

The matrix can first be shaped and calcined before impregnation. The shaping can be carried out, for example, by extrusion, by pelletizing, by the oil-drop method, by turntable granulation or by any other method that is well known to one skilled in the art.

The preformed matrix is then optionally calcined under air, usually at a temperature of at least 300° C., commonly from about 350 to 1000° C.

The impregnation of the matrix is preferably carried out by the so-called "dry" impregnation method that is well known to one skilled in the art. The impregnation can be carried out in a single stage by a solution that contains all of the constituent elements of the final catalyst.

The element of group VIIB and/or the element of group VIII, like the element of group VIB (Mo, W), and like the element that is selected from the group that is formed by P, B and Si and the element that is selected from group VIIA can be introduced into the catalyst at various levels of the preparation and in various ways. Said elements can be introduced, for example, only partly or completely at the time of the kneading of the porous matrix.

The element of group VIII, the element of group VIIB like the element that is selected from the group that is formed by P, B, Si and the element that is selected from among the elements of group VIIA, can be introduced by, for example, one or more ion exchange operations on the calcined matrix with a solution that contains at least one precursor salt of the metal of an element. It can be introduced by at least one impregnation operation of the matrix that is shaped and calcined, by a precursor solution of at least one element, for example a metal of group VIII, whereby any metal precursor of group VIII is preferably introduced at the same time or after any metal precursor of groups VIIB and VIIB.

In the case where the metals are introduced by several impregnations of corresponding precursor salts, an intermediate drying stage of the catalyst is generally carried out at a temperature that is generally between 60 and 250° C.

The shaping of the substrate catalyst according to the invention can be an extrusion, a pelletizing, the oil-drop method, a turntable granulation or any other method that is well known to one skilled in the art.

The element sources of group VIIB that can be used are well known to one skilled in the art. For example, it is possible to use oxides, hydroxides, polyoxometallates, alkoxides of formula $M(OR_1)_3$, where M is the metal and $R_1$ is an alkyl radical, oxalates, ammonium salts, salts such as fluorides, chlorides, bromides, iodides, oxyfluorides, oxychlorides, oxybromides, oxyiodides, phosphates, carbonyl complexes, nitrates, oxynitrates, cyclopentadienyl complexes, thiometallates, and carboxylates. The ammonium salts, nitrates and chlorides are preferably used.

The element sources of group VIB that can be used are well known to one skilled in the art. For example, among the sources of molybdenum and tungsten, it is possible to use oxides and hydroxides, molybdic acids and tungstic acids and salts thereof, in particular the ammonium salts such as ammonium molybdate, ammonium heptamolybdate, ammonium tungstate, phosphomolybdic acid, phosphotungstic acid and salts thereof, silicomolybdic acid, silicotungstic acid and salts thereof, acetylacetonates, xanthates, fluorides, chlorides, bromides, iodides, oxyfluorides, oxychlorides, oxybromides, oxyiodides, carbonyl complexes, thiomolybdates, thiophosphates, acetates, xanthates and thioxanthates, dithiophosphates, dithiocarbamates and dithiophosphinates and carboxylates. The oxides and the salts of ammonium such as ammonium molybdate, ammonium heptamolybdate and ammonium tungstate are preferably used.

The element sources of group VIII that can be used are well known to one skilled in the art. For example, the nitrates, sulfates, phosphates, halides, for example, chlorides, bromides and fluorides, and the carboxylates, for example acetates and carbonates, will be used.

The preferred phosphorus source is the orthophosphoric acid $H_3PO_4$, but its salts and esters such as the alkaline phosphates and the ammonium phosphates. The phosphorus can be introduced, for example, in the form of a mixture of phosphoric acid and a basic organic compound that contains nitrogen, such as ammonia, primary and secondary amines, cyclic amines, the compounds of the family of pyridine and quinolines and the compounds of the pyrrole family.

Many silicon sources can be used. Thus, it is possible to use the ethyl orthosilicate $Si(OEt)_4$, the siloxanes, the halide silicates such as ammonium fluorosilicate $(NH_4)_2SiF_6$ or sodium fluorosilicate $Na_2SiF_6$. The silicomolybdic acid and salts thereof, and the silicotungstic acid and salts thereof can also be advantageously used. The silicon can be added by, for example, impregnation of ethyl silicate in solution in a water/alcohol mixture.

The boron source can be boric acid, preferably orthoboric acid $H_3BO_3$, ammonium biborate or pentaborate, boron oxide, boric esters of formulas $B(OR)_3$ and $HB(OR)_2$, in which R is a hydrocarbon-containing radical that usually has 1 to 50 carbon atoms and can comprise heteroatoms in the chain or as a substituent on the chain. By way of example of hydrocarbon-containing radicals, it is possible to cite the methyl, ethyl, propyl, butyl, pentyl, heptyl and octyl radicals. Groups R in the formulas above can be identical or different from one another. Boron can be introduced by, for example, a boric acid solution in a water/alcohol mixture.

The element sources of group VIIA that can be used are well known to one skilled in the art. For example, the fluoride anions can be introduced in the form of hydrofluoric acid or salts thereof. These salts are formed with alkaline metals, ammonium or an organic compound. In the latter case, the salt is advantageously formed in the reaction mixture by reaction between the organic compound and the hydrofluoric acid. It is also possible to use hydrolyzable compounds that can release fluoride anions into the water, such as ammonium fluorosilicate $(NH_4)_2SiF_6$, silicon tetrafluoride $SiF_4$ or sodium tetrafluoride $Na_2SiF_6$. The fluorine can be introduced by, for example, impregnation of an aqueous solution of hydrofluoric acid or ammonium fluoride.

The chloride anions can be introduced in the form of hydrochloric acid or of these salts. These salts are formed with alkaline metals, ammonium or an organic compound. In the latter case, the salt is advantageously formed in the reaction mixture by reaction between the organic compound and the hydrochloric acid.

The catalyst contains an element of group VIIB such as technetium, manganese and rhenium and an element of group VIII such as iron, cobalt, or nickel. Among the metals of group VIIB, it is preferred to use rhenium, and among the metals of group VIII, it is preferred to use cobalt, or nickel. Advantageously, the combinations of the following metals are used: nickel-rhenium, cobalt-rhenium, iron-rhenium, or nickel-cobalt-rhenium.

The catalyst can contain an element of group VIB such as chromium, molybdenum, or tungsten. Among the metals of group VIB, it is preferred to use molybdenum or tungsten. Advantageously, the combinations of the following metals are used: nickel-rhenium-molybdenum, cobalt-rhenium-molybdenum, iron-rhenium-molybdenum, nickel-rhenium-tungsten, cobalt-rhenium-tungsten, iron-rhenium-tungsten, whereby the preferred combinations are: nickel-rhenium-molybdenum, and cobalt-rhenium-molybdenum. It is also possible to use combinations of four metals, for example nickel-cobalt-rhenium-molybdenum.

The impregnation of the metal of group VIIB or optionally the metal of group VIB can be facilitated by adding phosphoric acid into the solution of the metal of group VIIB or optionally the metal of group VIB, which makes it possible also to introduce phosphorus so as to promote catalytic activity. Other phosphorus compounds can be used as is well known to one skilled in the art.

The catalyst therefore also contains at least one usually amorphous or poorly crystallized porous mineral matrix. This matrix is usually selected from the group that is formed by alumina, silica, silica-aluminas, magnesia, clay, titanium oxide or zirconium oxide, boron oxide, aluminates; and, for example, the aluminates of magnesium, calcium, barium, manganese, iron, cobalt, nickel, copper and zinc; mixed aluminates, and, for example, those containing at least two of the metals cited above. It is preferred to use matrices that contain alumina, in all of these forms known to one skilled in the art, for example gamma-alumina.

The catalysts that are obtained by this invention are used in general in the form of cylindrical or multilobar extrudates.

They generally have a specific surface area that is measured by nitrogen adsorption according to the BET method that is between 50 and 600 $m^2/g$, a pore volume that is measured by mercury porosimetry of between 0.2 and 1.5 $cm^3/g$, and a pore size distribution that can be monomodal, bimodal or polymodal.

The catalysts according to this invention are used for the transformation of hydrocarbons, in particular for the hydrotreatment of hydrocarbon-containing feedstocks, such as petroleum fractions, fractions that are derived from carbon, etc . . . .

The invention also relates to a process for hydrotreatment of hydrocarbon-containing feedstocks with the catalyst that is described above.

A preferred catalyst for the hydrotreatment contains at least one non-noble metal of group VIII, at least one metal of group VIB, at least one metal of group VIIB and an element that is selected from the group that is formed by phosphorus, boron or silicon.

The feedstocks that are used in the process are generally selected from the group that is formed by gasolines, gas oils, vacuum gas oils, residues that may or may not be deasphalted, paraffinic oils, waxes and paraffins. They generally contain at least one heteroatom such as sulfur, oxygen or nitrogen and optionally at least one metal.

The catalysts of this invention can also be used advantageously during pretreatment of catalytic cracking feedstocks and in the first stage of hydrocracking or mild hydroconversion. They are then usually used in combination with a zeolitic or non-zeolitic acid catalyst for the second stage of the treatment.

The hydrotreatment conditions, such as temperature, pressure, hydrogen recycling rate, hourly volumetric flow rate, can be very variable based on the nature of the feedstock, the quality of the desired products and installations that the refiner uses. They are well known to one skilled in the art.

The temperature is in general greater than 200° C. and often between 250° C. and 480° C. The pressure is generally greater than 0.05 MPa and often greater than 1 MPa, ranging broadly up to 30 MPa. The presence of hydrogen is generally necessary with a hydrogen recycling rate generally of at least 50 and often between 80 and 5000 liters of hydrogen per liter of feedstock. The hourly volumetric flow rate is in general between 0.1 and 20 volumes of feedstock per volume of catalyst and per hour.

In the case of a hydrotreatment before hydrocracking, advantageously the temperature will be between 350–430° C., the pressure between 5–20 MPa, the volumetric flow rate between 0.1–5 $h^{-1}$ and the H2/hydrocarbon volumetric ratio between 150 and 2000. These conditions are particularly advantageous when the hydrocracking is carried out on a zeolitic catalyst.

The catalysts according to the invention are preferably (and in particular for the hydrotreatment) subjected to a sulfurization treatment that makes it possible to transform, at least in part, the metallic radicals into sulfides before carrying out the hydrotreatment, and generally therefore before they are brought into contact with the feedstock that is to be treated. This treatment of activation by sulfurization can be carried out by any method that is known to one skilled in the art.

A standard sulfurization method consists in heating the solid mixture under a stream of a mixture of hydrogen and hydrogen sulfide or under a stream of a mixture of nitrogen and hydrogen sulfide at a temperature of between 150 and 800° C., preferably between 250 and 600° C., generally in a flushed-bed reaction zone.

The results that are important to the refiner are the HDS and HDN activity. The desired goals should be carried out under conditions that are compatible with the economic reality.

The following examples illustrate this invention without, however, limiting its scope.

EXAMPLE 1

Preparation of the Alumina Substrate that Falls within the Composition of the Catalysts We produced a matrix with an alumina base in a large amount so as to be able to prepare the catalysts described below from the same shaped matrix. To do this, we used a matrix that consists of ultrafine tabular boehmite or alumina gel that is marketed under the name SB3 by the Condéa Chemie GmbH Company. This gel was mixed with an aqueous solution that contains nitric acid at 66% (7% by weight of acid per gram of dry gel) then kneaded for 15 minutes. At the end of this kneading, the paste obtained is passed through a die that has cylindrical orifices with a diameter equal to 1.3 mm. The extrudates are then dried for one night at 120° C. and then calcined at 550° C. for 2 hours under moist air that contains 7.5% by volume of water. Cylindrical extrudates with a diameter of 1.2 mm that have a specific surface area of 243 m$^2$/g, a pore volume of 0.61 cm$^3$/g and a monomodal pore size distribution that is centered at 100 Å(1 Å=10$^{-10}$ m) are thus obtained. X-ray diffraction analysis of the matrix reveals that the latter consists only of cubic gamma-alumina with low crystallinity.

EXAMPLE 2

C1-Substrate Mo Catalyst

We added molybdenum to the extruded substrate of Example 1 by dry impregnation in aqueous medium. The molybdenum salt is ammonium heptamolybdate Mo$_7$O$_{24}$(NH$_4$)$_6$.4H$_2$O. After dry impregnation, the extrudates are dried for one night at 120° C., then calcined at 500° C. for two hours under dry air. The final content of molybdenum trioxide is 3.2% by weight, which corresponds to 0.022 mol of the element molybdenum per 100 g of finished catalyst.

EXAMPLE 3

C2-Substrate Re Catalyst

We added rhenium to the extruded substrate of Example 1 by dry impregnation of a solution of ammonium perrhenate NH$_4$ReO$_4$ in water. After dry impregnation, the extrudates are dried for one night at 120° C. and then calcined at 500° C. for 2 hours under dry air. Catalyst JQ2 is prepared with a final content of rhenium trioxide of 12.8% by weight, which corresponds to 0.06 mol of the element rhenium per 100 g of finished catalyst.

EXAMPLE 4

C3-Substrate Ni Catalyst

We produced a nickel-type catalyst C3 deposited on alumina by impregnation of the alumina substrate of Example 1 by a nickel nitrate solution Ni(NO$_3$)$_2$.6H$_2$O. After drying and calcination under the same conditions as the preceding examples, the final nickel content is 2.6% by weight, which corresponds to 0.044 mol of the element nickel per 100 g of finished catalyst.

EXAMPLE 5

C4-Substrate [Ni+Re] Catalyst

A catalyst C$_4$ that contains nickel and rhenium with an atomic ratio r=Ni/(Ni+Re) equal to 0.44 was then prepared. The two metals are introduced by dry impregnation of the alumina substrate of Example 1 by using ammonium perrhenate NH$_4$ReO$_4$ and nickel nitrate Ni(NO$_3$)$_2$.6H$_2$O as precursors. The ammonium perrhenate is impregnated first, then the sample is dried for one night at 120° C. and calcined at 350° C. for two hours. The nickel nitrate is then impregnated, it is dried for one night at 120° C., and it is calcined at 500° C. for two hours under dry air. The contents by weight of oxide of the catalyst obtained are 12.8% of Re trioxide and 2.6% of Ni oxide or respectively 0.06 to 0.044 mol of the elements rhenium and nickel per 100 g of finished catalyst.

EXAMPLE 6

C5-Substrate [Ni+Re+Mo] Catalyst

We took a portion of catalyst C$_4$ whose production is described in Example 5, and we added molybdenum to it by dry impregnation in aqueous medium by using ammonium heptamolybdate Mo$_7$O$_{24}$ (NH$_4$)$_6$.4H$_2$O as a precursor. After dry impregnation, the extrudates are dried for one night at 120° C. and calcined at 500° C. for two hours under dry air. Catalyst C5 is obtained whose respective final contents by weight of rhenium trioxide, nickel oxide and molybdenum trioxide are 12.8%, 2.6% and 3.2%, which corresponds respectively to 0.06, 0.044 and 0.022 mol of the elements rhenium, nickel and molybdenum per 100 g of finished catalyst.

EXAMPLE 7

C6-Substrate [Ni+Re+P] Catalyst

We took a portion of catalyst C4 whose production is described in Example 5, and we added phosphorus to it by dry impregnation in aqueous medium using phosphoric acid H3 PO4.

After dry impregnation, the extrudates are dried for one night at 120° C. and calcined at 500° C. for two hours under dry air. Catalyst C6 is obtained whose final contents by weight of rhenium oxide, nickel oxide and phosphorus oxide are respectively 10.54% by weight of ReO3, 2.1% of NiO and 4.95% by weight of P2O5.

EXAMPLE 8

C7-Substrate [Ni+Re+Mo+P] Catalyst

We took a portion of catalyst C4 whose production is described in Example 5, and we added molybdenum and phosphorus to it by dry impregnation in aqueous medium by using ammonium heptamolybdate Mo$_7$O$_{24}$(NH$_4$)$_6$. 4H$_2$O and H$_3$PO$_4$. After dry impregnation, the extrudates are dried for one night at 120° C. and calcined at 500° C. for two hours under dry air. Catalyst C7 is obtained, whose respective final contents by weight of rhenium trioxide, nickel oxide, molybdenum trioxide and diphosphorus pentoxide are 12.8%, 2.6%, 3.2% and 5.8%, which corresponds respectively to 0.06, 0.044, 0.022 and 0.082 mol of the elements rhenium, nickel, molybdenum, and phosphorus per 100 g of finished catalyst.

EXAMPLE 9

C8-Substrate Mn Catalyst

We added manganese to the extruded substrate of Example 1 by dry impregnation of a solution of manganese nitrate $Mn(NO_3)_2.4H_2O$ in water. After dry impregnation, the extrudates are dried for one night at 120° C. and calcined under dry air for two hours. Catalyst C8 is prepared with a final content of manganese dioxide of 5.1% by weight, which corresponds to 0.06 mol of the element manganese per 100 g of finished catalyst.

EXAMPLE 10

C9-Substrate [Ni+Mn] Catalyst

A catalyst C9 that contains nickel and manganese with an atomic ratio r=Ni/(Ni+Mn) that is equal to 0.44 was prepared. The two metals are introduced by successive dry impregnation of the alumina substrate of Example 1 by using manganese nitrate $Mn(NO_3)_2.4H_2O$ and nickel nitrate $Ni(N_3)_2.6H_2O$ as precursors. After each dry impregnation, the extrudates are dried for one night at 120° C. The sample undergoes a final calcination at 500° C. for 2 hours under dry air. Catalyst C9 is prepared with a final content of manganese dioxide of 5.1% by weight and a nickel oxide content of 2.6% by weight. The final content of the element nickel and the element manganese deposited on the alumina of Example 1 is 0.06 mol of Mn and 0.044 mol of Ni per 100 g of finished catalyst.

EXAMPLE 11

C10-Substrate [Ni+Mn+Mo] Catalyst

We took a portion of catalyst C10 whose production was just described, and we added molybdenum to it by dry impregnation in aqueous medium by using $Mo_7O_{24}(NH_4)_6.4H_2O$ as a precursor. After dry impregnation, the extrudates are dried for one night at 120° C. and calcined for two hours at 500° C. under dry air. Catalyst C10 is obtained whose respective final contents by weight of manganese dioxide, nickel oxide and molybdenum trioxide are 5.05%, 2.5% and 3.2%, which corresponds respectively to 0.06, 0.044 and 0.022 mol of the elements manganese, nickel and molybdenum per 100 g of finished catalyst.

EXAMPLE 12

C11-Substrate [Ni+Mn+Mo+P] Catalyst

We took a portion of catalyst C9 whose production is described in Example 10, and we added molybdenum and phosphorus to it by dry impregnation in aqueous medium by using ammonium heptamolybdate $Mo_7O_{24}(NH_4)_6.4H_2O$ and $H_3PO_4$. After dry impregnation, the extrudates are dried for one night at 120° C. and calcined at 500° C. for two hours under dry air. Catalyst C11 is obtained whose contents by weight are 4.3% by weight of MnO2, 2.2% by weight of NiO, 3.4% by weight of MO3 and 5.1% by weight of P2O5.

| SUMMARY TABLE OF THE CATALYSTS OF THE EXAMPLES | |
|---|---|
| Reference | Catalyst |
| C1 | Mo/alumina |
| C2 | Re/alumina |
| C3 | Ni/alumina |
| C4 | (Ni + Re)/alumina |
| C5 | (Ni + Re + Mo)/alumina |
| C6 | (Ni + Re + P)/alumina |
| C7 | (Ni + Re + Mo + P)/alumina |
| C8 | Mn/alumina |
| C9 | (Ni + Mn)/alumina |
| C10 | (Ni + Mn + Mo)/alumina |
| C11 | (Ni + Mn + Mo + P)/alumina |
| C12 | (Mo + Re + P)/alumina |

EXAMPLE 14

Gas-Oil Hydrodesulfurization Tests

The substrate catalysts described above have also been compared in a gas-oil hydrodesulfurization test whose main characteristics are given in the table below:

| | |
|---|---|
| Density at 15° C. | 0.856 |
| Index of refraction at 20° C. | 1.4564 |
| Viscosity at 50° C. | 3.72 cSt |
| Sulfur | 1.57% by weight |
| Simulated distillation | |
| PI | 153° C. |
| 5% | 222° C. |
| 50% | 315° C. |
| 95% | 415° C. |
| PF | 448° C. |

The gas-oil HDS test is conducted under the following operating conditions:

| | |
|---|---|
| Total pressure | 3 MPa |
| Catalytic volume | 40 cm$^3$ |
| Temperature | 340° C. |
| Hydrogen flow rate | 20 l/h |
| Feedstock flow rate | 80 cm$^3$/h |

Each of the catalysts is sulfurized before the test by a gas oil/DMDS mixture up to 350° C. The catalytic performances of the catalysts that are tested are provided in Table 2 below. The activity is calculated by taking into consideration that the reaction is on the order of 1.5. The equation linking the activity and the conversion (% of HDS) is then as follows:

$$\text{Activity} = \left[ \frac{100}{(100 - \% \text{ of } HDS)} \right] 0.5 - 1$$

In Table 2, the activities are expressed in relative activity by assuming that the one of catalyst C2 is equal to 1.

TABLE 2

Activity of the Catalysts in Hydrodesulfurization of Gas Oil

| Catalyst | Activity Relative to JQ2 | Composition |
| --- | --- | --- |
| C2 | 1 | Re/alumina |
| C4 | 2.2 | (Ni + Re)/alumina |
| C5 | 2.6 | (Ni + Re + Mo)/alumina |
| C6 | 2.7 | (Ni + Re + P)/alumina |
| C7 | 3.4 | (Ni + Re + Mo + P)/alumina |
| C9 | 0.8 | (Ni + Mn)/alumina |
| C10 | 1.1 | (Ni + Mn + Mo)/alumina |
| C11 | 1.4 | (Ni + Mn + Mo + P)/alumina |
| C12 | 2.7 | (Mo + Re + P)/alumina |

The gas-oil HDS performance of the catalysts that contain nickel, rhenium and phosphorus at the same time is in each case superior to the performance of the catalysts that do not contain phosphorus, as the comparison between catalysts C5 and C7 or C4 and C6 shows.

The simultaneous presence of non-noble GVIII, GVI and phosphorus is advantageous (comparison of C4 and C7 or else C9 and C11 or else C7–C12).

The invention claimed is:

1. A catalyst consisting essentially of
   (A) at least one matrix that consists of alumina, silica, silica-alumina, clay, magnesia, titanium oxide, zirconium oxide, or boron oxide,
   (B) rhenium in an amount of 10 to 20 wt % based on the total catalyst mass,
   (C) nickel,
   (D) molybdenum,
   (E) optionally, at least one element from group VIIA, and
   (F) phosphorus deposited on the matrix.

2. A catalyst according to claim 1 in which the group VIIA element is fluorine.

3. A process for the hydrotreating of hydrocarbon feeds, comprising contacting a hydrocarbon feed with a catalyst according to claim 1.

4. A catalyst according to claim 1, wherein rhenium is present in an amount of 10–15 wt % based on the total catalyst mass.

5. A catalyst according to claim 1, wherein molybdenum is present in an amount of 0.1–5 wt % based on the total catalyst mass.

6. A catalyst consisting essentially of in weight % with respect to the total catalyst mass:
   (A) 10–20% of rhenium;
   (B) 0.01% to 99.7% of at least one matrix that consists of alumina;
   (C) 0.01% to 50% of nickel;
   (D) 0.01 to 20% of phosphorus deposited on the at least one matrix;
   (E) up to 15% of at least one group VIIA element.

7. A process for the hydrotreating of hydrocarbon feeds, comprising contacting a hydrocarbon feed with a catalyst according to claim 6.

8. A catalyst according to claim 6, wherein rhenium is present in an amount of 10–15 wt % based on the total catalyst mass.

9. A catalyst according to claim 6, wherein molybdenum is present in an amount of 0.1–5 wt % based on the total catalyst mass.

10. A catalyst consisting essentially of
    (A) at least one matrix that consists of alumina,
    (B) rhenium in an amount of 10 to 20 wt % based on the total catalyst mass,
    (C) nickel,
    (D) molybdenum,
    (E) optionally, at least one element from group VIIA, and
    (F) phosphorus deposited on the matrix.

11. A catalyst according to claim 10, in which said group VIIA element is fluorine.

12. A process for hydrotreating a hydrocarbon feed, comprising contacting a hydrocarbon feed with a catalyst according to claim 10.

13. A process according to claim 12, in which the hydrocarbon feed is selected from the group consisting of gasolines, gas oils, vacuum gas oils, residues which may or may not be deasphalted, paraffin oils, waxes and paraffins and said hydrocarbon feed may optionally contain at least one heteroatom such as sulphur, oxygen or nitrogen and at least one metal.

14. A process according to claim 12 performed prior to hydrocracking the hydrocarbon feed.

15. A process according to claim 12 wherein the catalyst has been sulphurised.

16. A catalyst according to claim 10, wherein rhenium is present in an amount of 10–15 wt % based on the total catalyst mass.

17. A catalyst according to claim 10, wherein molybdenum is present in an amount of 0.1–5 wt % based on the total catalyst mass.

18. A catalyst comprising
    (A) at least one matrix that consists of alumina, silica, silica-alumina, clay, magnesia, titanium oxide, zirconium oxide, or boron oxide,
    (B) rhenium in an amount of 10 to 20 wt % based on the total catalyst mass,
    (C) nickel,
    (D) molybdenum,
    (E) optionally, at least one element from group VIIA, and
    (F) phosphorus deposited on the matrix.

19. A process for the hydrotreating of hydrocarbon feeds, comprising contacting a hydrocarbon feed with a catalyst according to claim 18.

20. A catalyst according to claim 18, wherein rhenium is present in an amount of 10–15 wt % based on the total catalyst mass.

21. A catalyst according to claim 18, wherein molybdenum is present in an amount of 0.1–5 wt % based on the total catalyst mass.

* * * * *